Aug. 12, 1969 W. C. EMERSON 3,461,433

RELATIVE ADDRESSING SYSTEM FOR MEMORIES

Filed Jan. 27, 1967 4 Sheets-Sheet 1

INVENTOR
WALDO C. EMERSON
BY Charles A. Johnson
ATTORNEY

INVENTOR
WALDO C. EMERSON
BY Charles A. Johnson
ATTORNEY

INVENTOR
WALDO C. EMERSON
BY Charles A. Johnson
ATTORNEY

Aug. 12, 1969 W. C. EMERSON 3,461,433

RELATIVE ADDRESSING SYSTEM FOR MEMORIES

Filed Jan. 27, 1967 4 Sheets-Sheet 4

INVENTOR
WALDO C. EMERSON
BY Charles A. Johnson
ATTORNEY

United States Patent Office 3,461,433
Patented Aug. 12, 1969

3,461,433

RELATIVE ADDRESSING SYSTEM FOR MEMORIES

Waldo C. Emerson, Bloomington, Minn., assignor to Sperry Rand Corporation, New York, N.Y., a corporation of Delaware Filed Jan. 27, 1967, Ser. No. 612,256
Int. Cl. G11b *13/00*
U.S. Cl. 340—172.5 14 Claims

ABSTRACT OF THE DISCLOSURE

This disclosure relates to digital computing apparatus and methods for accessing addressable memory registers in a memory system, and it has particular reference to an addressing system for calculating in absolute memory address from a programmed relative address and for selecting a portion of the memory system to be accessed. Further, it includes teaching of a system for programmably selecting between ones of a plurality of addressing modes.

BACKGROUND OF THE INVENTION

Field of the invention

This invention relates to an improved data processing system, and more particularly, it relates to digital computers and similar types of machines which are useful for performing computation, data processing, and related control functions. Specifically, the invention described is that of a relative memory addressing system which facilitates the implementation of time shared programming by providing programmed relative addressing modes of operation.

Description of the prior art

In internally programmed automatic computers, the storage medium is ordinarily employed as an internal memory for storing operands, and for storing computer commands. Operands are normally data which is to be operated upon, and the commands collectively are programs to be carried out automatically by the computer. It is common practice in many digital computers of the present day to provide a predetermined repertoire of instructions. That is, a predetermined operational capability is defined with each of the individual commands operating to perform a specific function. It is also common in a total computer instruction word to include, in addition to the command portion, at least one address portion which designates an addressable location in the memory section. Additionally, for those machines which include indexing capabilities, commonly referred to as "B-boxing," and other similarly well-known control functions, the instruction word contains signal representations indicative of these various control functions. The command portion of the instruction indicates the operation which is to be performed by the computer, and the address portion of the instruction indicates the address in the storage medium at which is located the numerical information upon which the operation is to be performed. It should be noted that the address portion may not directly refer to the absolute memory address desired to be accessed; but instead, may require manipulation by the control section to achieve the desired absolute address. For branching instructions, the address portion may also designate the address in memory to which the sequence of instructions is to proceed. Storage medium such as magnetic core storage, magnetic drum storage, magnetic disc file storage, or any of the other well-known types of storage systems are normally divided into addressable storage locations which are referred to as addressable registers, accessible storage cells, or other well-known terms of art. These addressable registers are accessible to the computing system by presenting an address comprised of a plurality of signals indicative of the addressable location, to address translation circuitry, whereby signals are generated to cause either reading from, or storing into, the desired storage location as determined by the command portion of the instruction.

In order to solve a particular problem with a digital computer, it is standard to form a predetermined list of computer instruction words and to store these instruction words in the memory section of the computer in addressable locations. It is also common after a sequence of instructions for solving a particular problem is determined, to store the data words, such as constants to be used in the calculation or other data that is to be manipulated by the programming, at the end of the stored program.

With the advent of computers that operate at higher and higher computational rates and have much expanded computational capacity, it has become desirable to provide a plurality of independently operable programs in the memory section and to provide an executive control program which will cause a particular selected one of these programs, often referred to as a worker program, to be processed until such time it is either completed or is interrupted for some reason. Following completion of the worker program, a new worker program is initiated by the executive program. In the alternative, when the executive program determines that an undue amount of computational time will be wasted in waiting for a piece of peripheral equipment to be started up or to complete an operation, it can temporarily interrupt the performance of one of the worker programs and proceed to execute a portion of another worker program. This manner of operation is referred to as time-sharing, and results in great efficiency in the use of a total complex system. In addition to the program stored in the memory section of the computer, it is common practice to have programs available on storage media external to the computer. These programs can be called for execution in the computer when time and storage space becomes available. One of the difficulties which seriously limits the application of large scale digital computers in the continous execution of various independent worker programs is the fact that when programs are generated they are commonly assigned a predetermined sequence of storage addresses, and the operands which are to be manipulated are normally stored in a predetermined sequence of storage locations. This seriously limits the storage space available in the memory section when a new program to be loaded would fall in the middle of the range of instructions that is currently being executed. When the next worker program to be loaded and executed also requires all or a portion of the memory locations in which an operating program is stored, many prior art systems do not allow the new program to be called in. It then becomes necessary to try to select another worker program which will fit the memory configuration available, or simply to wait until the completion of the program in process and waste the time necessary for loading the next program at its completion.

In view of the foregoing, it can be seen that it is most convenient to be able to relocate a series of operands or a series of instructions at some other addressable location in the memory to facilitate the entry of another program into the memory. In the past, solutions of this problem that have been tried have been cumbersome at best, and when large programs are involved, virtually impossible. A common solution that has been tried, and generally found very ineffective, is to provide a program which attempts to evaluate the stored instructions and to relocate the entire program at a different sequence of addressable locations. Due to the amount of evaluation and decision-making that these programs must perform, they are generally large in the number of instructions required; hence, required a large portion of the memory section for this housekeeping operation. Further, such relocation programs are normally very ineffiecient in the use of computer time. Another prevailing technique is to carefully avoid in the absolute programming of address designation, duplication of addresses between programs which are anticipated to be stored in the machine simultaneously. This, of course, requires that the programmer be able to forecast which programs will be in the machine simultaneously, and therefore, seriously limits the versatility of the computing operation by limiting the programs which can be available in the memory section of the computer at any given time to that degree of foresight provided by the programmer. It can be seen that this has a most inefficient approach to solving the problem of time sharing.

One approach to the foregoing described problems of time sharing and program relocation, has been described in copending patent application of J. P. Ashbaugh et al., Ser. No. 493,180, filed Oct. 5, 1965, now U.S. Patent No. 3,389,380, and assigned to the assignee of this invention. In that system, the programming is done on a relative addressing basis. A pair of base address registers are provided, one of which stores a base address for an instruction portion, and the other stores a base address for a data portion in the memory for a given worker program. The worker program is then coded such that the address reference in each instruction is relative to address 0. This programmed relative address is then biased by a bank of adders both by the bias (base address) for the instruction portion and the bias (base address) for the data portion. A memory section pointer constant is also described. Having formed the pair of biased memory addresses, as modified by the B-register indexing, it is necessary to decide which of the addresses is in fact the absolute address desired. This is accomplished by comparing the absolute addresses to the memory area pointer constant thereby effecting a selection of the absolute address. In that system, to rearrange any given worker program into another memory section storage area, it is necessary only to modify the base addresses. Such a system is very versatile and made great improvement over the prior art existing at that time.

This invention relates to the copending patent application to the extent that it accomplishes a similar goal, that is, providing a system for base relative addressing which facilitates time sharing a program solution and relocation in the computer's memory of programs. The subject invention is an improvement over the copending application Ser. No. 493,180 in that it materially saves in the amount of circuitry that is required to perform a generation of an absolute address from the base addresses provided and the base relative address referred in the respective instructions. Further, it provides programmable alternatives not readily available to the copending application. It will be noted in the copending application that dual banks of adder circuits are required in conjunction with a set of compare circuits which operate to select the absolute address that will reference memory. It can be seen that this is relatively expensive to the hardware implementation that will be described below, wherein place of five total adder circuits only two adder circuits are required and a comparison circuitry is eliminated. A primary objective of this invention, then, is to provide an improved base relative addressing system for accessing a memory section to facilitate time shared program execution and program relocation.

SUMMARY OF INVENTION

This invention comprises an improved data processing system wherein program time sharing and program relocation can be effectively accomplished through the utilization of an improved base relative addressing system for computer memories. Further, the invention provides two relative addressing modes, namely, single and dual, and a mode of addressing where no relative addressing is used. As these words indicate there is a single base relative address constant for single mode relative addressing and two base addresses for dual relative addressing. The selection between single and dual relative addressing modes is programmably selectable. To achieve the base relative addressing operation, first and second registers are provided for storing first and second base address constants. The base address constants are numbers indicative of the removal of the start of the respective storage areas from a predetermined location, such as addressable position 0. Both of these registers have output terminals coupled to selector circuitry. It is the function of the selector circuitry, in response to control signals, to select between the signal and dual modes of base relative addressing and to select which of the base addresses will be added to the programmed relative address provided in the instruction word. One of the storage registers used for storing the base addresses is utilized for both the single and the dual relative addressing modes, while the other of the storage registers is used only in the dual relative addressing mode. A programmed relative address is referred to in an instruction word and is directed to a first adder. If indexing modification is required, an index-register is referred to in the instruction for specifying a value stored in the index-register which is to modify the address portion of the instruction. These two values are combined in a first adder and the sum directed to a second adder. In the second adder the selected base address is added to the modified relative address thereby providing a second sum which is indicative of the absolute address to be referenced in the memory. The designation of the area of memory to be accessed, thereby defining which base address is to be utilized, is programmed rather than left to a comparison as was done in the copending application. Accordingly, this system eliminates the need for a comparison circuit. Further, since the selection of the base address modification is made in advance through the program operation, it is unnecessary to derive in parallel two absolute addresses and select the desired one immediately preceding the memory access operation. Accordingly, the subject invention improves materially over that of the copending application through the savings in hardware, and is far superior to other prior art systems. Further, the philosophy of programmed control between single and dual base relative addressing is an improvement over the copending application. In the copending application, it was necessary for the executive program to generate a memory area pointer constant for purposes of making the final selection between the absolute addresses that were generated in parallel. In this system such operation of the executive program is unnecessary.

CONVENTIONS

Figure 1:
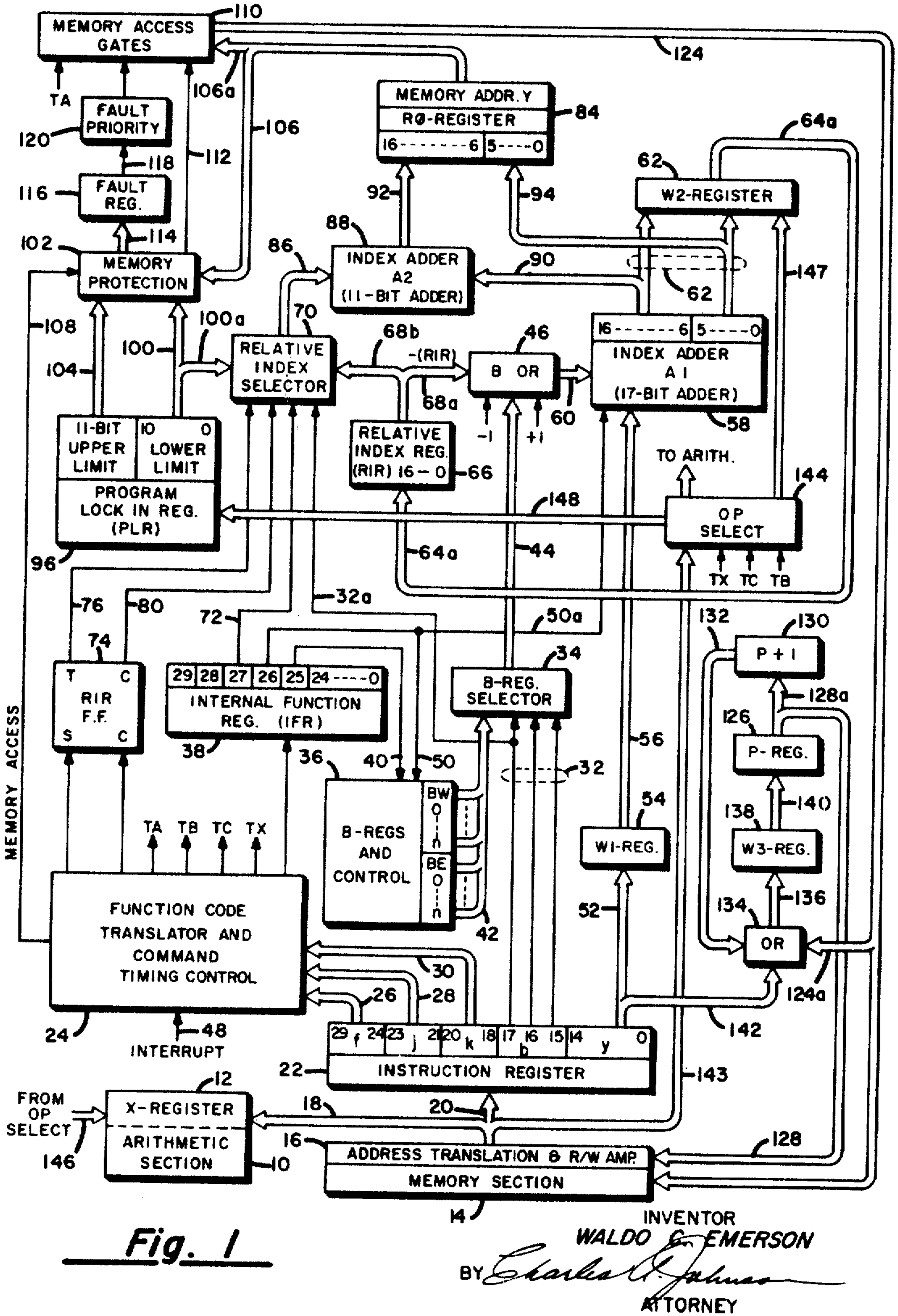
FIGURE 1 is a logic block diagram of the data processing system which incorporates the subject invention.

The following circuitry discussion of the improved data processing system will be in terms of block and logic diagrams since the detail operations of the various elements are well-known. Throughout the discussion, various registers will be referred to. These registers can be considered to be comprised of a plurality of bistable flip-flop circuits selected from the types readily available in the commercial market place. It will be understood that each flip-flop is capable of being set to one of two possible static states. It will further be understood that both the true and the complement value of the existing static state are available as output signals. For example, if a voltage level indicative of a true value of a digit is set into the flip-flop, the voltage level indicative of the true value will be available at the true output terminal, and a voltage level indicative of the complement value will be available at the clear output terminal. If the flip-flop is cleared, the foregoing is reversed. The registers to be described are comprised of varying numbers of individual stages. The least significant stage is referred to as $2^0$ with succeedingly higher ordered stages being sequentially numbered through the capacity of the register.

The line connections between the various elements are of two basic types. A set of parallel lines terminated by an arrowhead indicates parallel conductive paths for carrying a plurality of signals. Where it is felt desirable for clarity, the parallel lines have an enlarged portion with a number shown therein which is indicative of the number of conductors in the cable. In the block diagrams, a single line normally indicates a conductive path for carrying control signals. It should be recognized, of course, that there is no particular distinction between what is termed a "control signal" or a "data signal" other than it is convenient for purposes of discussion to distinguish therebetween. Further, it should be understood that data signals can and often are utilized in performing control functions at various stages. The interconnection lines are terminated by arrowheads. The arrowhead denotes the direction of signal flow and can be considered to be points of circuit interconnection. The detailed operation of the various circuit elements will not be described nor will the precise circuit diagrams for each such element be illustrated, since it is felt that this would not tend to add to the understanding of the subject invention. Furthermore, the block diagrams illustrated are readily understood by those skilled in the art and fully define the invention.

For purposes of this discussion, the terms "logical 1" and "logical 0," or simply "1" or "0," will be utilized to designate the appropriate signal level which is indicative of a binary "1" or "0" value. The numerical designation of these signals is felt to be advantageous in this discussion in that precise signal levels will vary depending upon the circuitry selected for any particular implementation variation.

In referring to an address in the addressable memory, the symbol Y* is utilized. To represent the programmed base relative address designated in the instruction word, the letter *y* is used. The base relative address as modified by the indexing operation is referred to as Y. To represent an operand stored at the absolute address Y*, the designation is (Y*), with the parenthesis indicating an operand stored at the specified address. The designation $(\overline{Y^*})$ is utilized to represent the 1's complement of the operand stored at Y*.

DESCRIPTION OF EMBODIMENT

The invention will be described in the environment of an operational data processing calculator. It is usual for such data processing calculators to have an established repertoire of instructions. The repertoire of instructions normally define the operation which the calculator can perform, such as add, subtract, multiply, store, divide, and the like. In a stored program calculator, the list of instructions which defines a worker program, and are to be performed are normally stored in a memory section from whence they are individually read out for execution. The order of reading out of the instructions can be controlled by an instruction address counter for selecting sequential instructions, or it can be of the type where each instruction designates the address of the next instruction to be executed. The mode of control is mentioned generally and will be discussed in somewhat more detail below. In the course of system operation, the instructions are normally read into an instruction register. The instructions normally include an operation code, that is, the part which defines the operation to be performed by the calculator. The instruction also includes an address portion for addressing the main memory for selecting operands either to be read out therefrom or stored therein. Additional designators are commonly employed to provide address modification by way of indexing, commonly referred to as *b*-boxing, for providing an indirect addressing and for determining whether or not a full length memory register or some portion thereof is to be utilized. When the instruction resides in the instruction register, the operation portion is normally translated by an operation code translator for selecting a particular set of control sequence circuits which will provide control signals for guiding the execution of the particular operation to be performed. Data processing machines known in the art are of the single-address type, that is, one wherein only one memory register of the main memory can be addressed in any given instruction; double-address machines wherein each instruction can designate two addresses in the main memory; or three-address machines. The discussion of the preferred embodiment will be directed to a single-address machine.

Turning now to a consideration of FIG. 1, a treatment will be made of the hardware relationship of the data processing system which incorporates an embodiment of this invention. Illustrative examples of various addressing operations will be given under the heading Operation. The Arithmetic Section 10 is that part of the computer which performs the numeric and logical calculation. It is shown as a single block but will be understood to include a main adder and registers required for performing arithmetic operation in both fixed and floating point notation. For purposes of this discussion it can be considered that all communication between the Arithmetic Section 10 and the remainder of the data processing system is through the X-Register 12. The precise nature and operation of the Arithmetic Section 10 need not be considered further since its operation is incidental only to the operation of the subject invention.

The Memory Section 14 is comprised of 131K addressable 30-bit storage registers in a range of addresses from 000000 through $377777_8$. The Memory Section is comprised of a plurality of addressable storage registers which can individually be comprised of magnetic core registers, bistable flip-flop registers, thin film registers, or can be selected from plated wire memories, magnetic drum memories, magnetic disc record members or any other well-known type of memory apparatus which utilizes addressable storage registers. Included in the designation of Memory Section 14, but not shown in detail, is the Address Translation and Read/Write Amplifier 16. These circuits and translation systems will be selected to correspond to the nature of the memory element utilized in the storage portion of the Memory Section 14. These types of systems and amplifiers are well-known in the art and need not be described further. The Memory Section 14 communicates with the Arithmetic Section 10 through cable 18. Instructions that are read from Memory Section 14 are directed through the Address Translation and Read/Write Amplifier circuitry 16 on cable 20 into the Instruction Register 22. The upper portion of the illustration of the Instruction Register indicates the portions of the register by identifying the respectively ordered stages in the register, which performed the various functions of the total instruction word. The basic instruction format for internal operation of the computer is as follows:

*f*—Function code designator consisting of six-bits which, when decoded, specify the major internal operation to be performed.

*j*—Branch condition designator consisting of three-bits which, when decoded, specify skip or jump conditions, registers, or repeat modifications.

*k*—Operand interpretation designator consisting of three-bits which, when decoded, defines the source and form of the operand. The interpretation of *k* is different for the read, store and replace categories of instructions.

*b*—Index designator consisting of three-bits which, when decoded, specify the B register to be used in conjunction with the modification of the *y* portion.

*y*—Operand, or operand address designator, which consists of 15 bits. Depending on *k*, *y* may represent an operand or an operand address. It will be pointed out that the basic structure of the instruction held in the Instruction Register is interpreted differently for input/output instruction words and for unique modes of operation within the machine. These different configurations will not be described, however, since they do not add to an understanding of this invention.

A Function Code Translator and Command Timing Control system of circuitry 24 is utilized to provide the translation and control of all internal operations in the data processing system. This Command Timing circuitry will be referred to as CT. Commonly an oscillator is used as a primary source of regularly occurring signals, and such is the case in the CT, but is not shown in detail. These signals are used to drive timing chain circuits; that is, groups of circuits which provide control pulses at predetermined times for guiding the operation of the various instructions. The *f*-designator is directed on cable 26 to CT where it is translated for defining the operation to perform. The translator is not shown in detail but operates on the particular bit configuration of the *f*-designator to select an appropriate set of circuits for providing timing signals for controlling the internal operation. This operation of the Function Code Translator and Command Timing Control 24 is well-known and need not be considered in detail. The *j*- and *k*-designators are also fed to CT via cables 28 and 30 respectively for evaluation and additional control selection as indicated above in the consideration of the function of these designators.

The *b*-designators of the Instruction Register 22 is directed on conductors shown collectively at 32 to the B-Register Selector 34. The B-Register Selector 34 is a gating network which translates the numerical value of the *b*-designator and selects the appropriate B-Register for transmisison.

Figure 4:
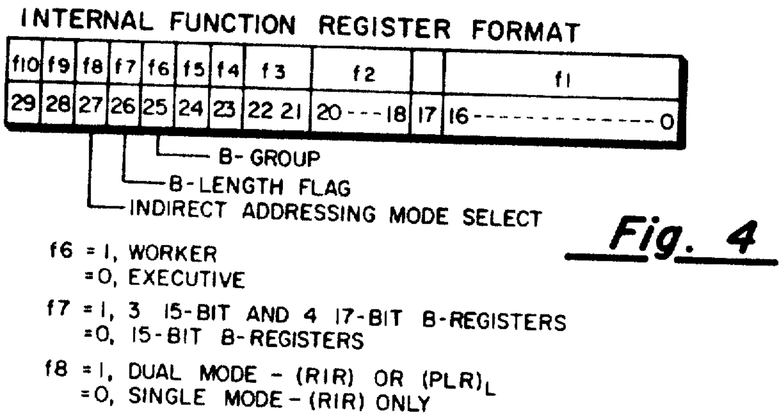
FIGURE 4 illustrates a format of the Internal Function Register.

The indexing registers are referred to as B-Registers and are shown in block form as B-Registers and Control 36. For the embodiment, there are 14 addressable B-Registers with the number being divided into 2 sets of 7 each. One set (BE) is allocated to the executive program and the other set (BW) allocated to the worker programs. The selection of the set of B-Registers is accomplished by the setting of a designator in the Internal Function Register (IFR) 38. FIGURE 4 illustrates the format of the Internal Function Register. The Internal Function Register 38 is used to allow an orderly return to programs which have been momentarily disrupted to honor an interrupt. IFR is divided into unique fields designated *f*0 through *f*10. The bit configuration for each of the pertinent ones of these designator fields is as illustrated in FIGURE 4. The uses of the fields that are relevant to consideration of this invention will be described as they occur. From a consideration of FIGURE 4, it can be seen that in selecting the set of B-Registers that is to be active, it is the *f*6 designator, bit position $2^{25}$, that selects the group. A value of 1 for *f*6 selects the B-Registers allotted to the worker program (BW); while a value of 0 for *f*6 operates to select the set of B-Registers assigned to the executive program (BE). The value of *f*6 is provided on conductor 40 as an input to the B-Registers and Control 36. The signals provided from *f*6 makes a preliminary selection between the two banks of B-Registers by controlling which bank of the set of B-Registers for the executive or the worker programs will be finally selected by the *b*-designator. It will be the function of the value of *f*6 to determine which of these two groups will be transmitted on cable 42 to the B-Register Selector 34. It is the function, then, of the B-Register Selector 34 to select from the set of B-Register values presented thereto the particular B-Register to be transmitted on cable 44 to the B OR circuitry 46. The B Group Flag *f*6 in IFR 38 determines which set of B-Registers is active at any given time. The set (BE) for the executive program is activated when the machine is master cleared or when an interrupt signal is received on conductor 48. It is necessary that the executive program contain an instruction for loading IFR in order to activate the set of B-Registers (BW) for the worker program when ready to enter a worker sequence. The worker program in operation returns control to the executive program by means of an interrupt, thereby deactivating the worker set (BW) and activating the executive set (BE) of B-Registers.

Each set of B-Registers BW and BE is designed to operate in one of two possible modes. In one mode, all of the B-Registers operate as 15-bit registers. In the other mode, a first group operates as 15-bit registers and a second group operates as 17-bit registers. For the embodiment shown, there are seven addressable registers for each of the two sets. The first group in each set is designated as B1, B2 and B3 and the second group is designated as B4, B5, B6 and B7. To determine which mode is active, a B-Length Flag designator *f*7 is examined in IFR 38. When *f*7 is set equal to 0, all of the B-Registers in the selected group are 15-bit registers. When *f*7 is equal to one, three of the B-Registers are treated as 15-bit registers and the remaining four are treated as 17-bit registers. The *f*7 designator is transmitted to B-Registers and Control 36 by conductor 50 and operates to select whether or not the higher ordered two-bits of the four B-Registers that are to be treated as active for 17-bit registers in the selected group and whether they are to be transmitted or not. When the date processing system is clear or an interrupt occurs, the B-Length Flag *f*7 is set, thereby activating 17-bit B-Register mode. The system then operates with the executive registers BE using three 15-bit and four 17-bit registers. When the executive program either enters a worker program for the first time or returns later, the IFR 38 is loaded with the appropriate *f*7 and *f*6 designator bit selections to select the worker set of registers BW and to select the desired B-Register length. The selection of B-Register capacity is important in the range of addressable areas that may be selected. Use of a 15-bit B-Register length allows access to any address within a 32000 register range. In the 15-bit B-Register mode, any program, including instructions and data must be contained within a 32000 word area. Using the Relative Index Register (RIR), which will be described later, the absolute starting address of 32000 can be varied throughout the 131000 word memory in increments of $64_{10}$ words. The 17-bit B-Register length allows a program to reference data outside the 32000 word range. Data can be referenced and stored any place in the 131,000 word memory and can be referenced directly by the program using the 17-bit B-Registers.

In forming the address modification, the *y*-designator from the Instruction Register 22 is directed on cable 52 to the 15 stage W1-Register 54. The output of the W1-Register is directed on cable 56 as one set of parallel inputs to an Index Adder A1, labeled 58. The other set of parallel input signals to A1 are from the B OR circuitry 46 on cable 60. Index Adder A1 58 is a full adder of a type available in the prior art. The A1 added 58 performs an end-around-carry addition process, and therefore, cannot produce an all zero output except with all zeros on both inputs. The length of the operands handled by A1 may be 15-bits or 17-bits depending upon the operation and the length of the B-Registers being used. The selection is made by the control signal provided from *f7* of IFR on control line 50*a*. When used as a 15-bit adder, the outputs of bit positions 15 and 16 are forced to zeros. The stages of the W1-Register 54 are directed to the lowest ordered 15 stages (0–14) of the A1 adder. Similarly, the 15-bit B-Register selected is directed to the lowest order 15 stages. Only for 17-bit B-Registers selection are signals directed to the higher ordered two stages of Index Adder A1. Accordingly, the length of the addition for $y+B_b$ is dependent upon the IFR B Length designator *f7* and the selection of $(B_b)$. For 17-bit B-Registers, the resultant sum provided on cable 62 will be a 17-bit number. For 15-bit B-Register selection, the higher ordered two stages in the 17-bit sum will be zeros. The A1 adder 58 is used for:

(1) forming $y+(B_b)$ during address modification
(2) incrementing or decrementing $(B_b)$ for B skip or B jump;
(3) forming (P)–(RIR) for return jump or enter B and jump;
(4) modifying *y* during execution of a repeat; or
(5) incrementing *y* during multiple-reference instructions.

Of these uses, only item 1 is of primary interest to the consideration of this invention. The −1 and +1 and −(RIR) input indications to B OR 46 are indicative of the types of input signals that are required for the other operations 2 through 5. The B OR circuitry selects which set of input signals will be directed to Index Adder A1. It should be noted that the formation of (P)–(RIR) is a 17-bit process regardless of the IFR B Length selection *f7*, or of the Group selection *f6*. The value stored on a return jump is 15-bits in length, and the value stored on an enter B and jump is 17-bits.

One of the destinations of the value *y* is the W2-Register 62, and is used in loading RIR. The value *y* is taken from the W2-Register on cable 64*a* as a 17-bit input to the Relative Index Register (RIR) 66. The complement value of the operand stored in RIR is directed on cable 68*a* as a parallel input to the B OR circuitry for use in forming (P)–(RIR). The true value of signals stored in RIR stages 6 through 16 are directed on cable 68*b* as parallel inputs to Relative Index Selector circuitry 70. The Relative Index Selector circuitry 70 is basically a gating network for establishing whether or not relative addressing is to take place and for selecting between one of two base relative addresses. In order for dual mode relative addressing to take place, it is necessary that a designator *f8* be established in IFR 38. The *f8* designator is directed as a control input to Relative Index Selector 70 on control line 72. A value of zero for *f8* indicates a programmed selection of single mode of relative addressing wherein only RIR is referenced for forming the absolute address *y**. A value of one for *f8* designator results in the dual mode selection of base relative addressing, wherein either the base address stored in RIR or the base address stored in $PLR_L$, to be described below, provide the base address to be used in the final address determination of Y*.

A further condition for the base relative address operation is that an instruction be executed for setting RIR active. When this instruction is executed by Function Code Translator and Command Timing Control 24, the RIR flip-flop 74 is set. When set, an active signal is provided on line 76 as another enabling input to the Relative Index Selector 70. Until such time as the RIR flip-flop 74 is set, an inhibit signal is present on line 76 and no relative indexing will be accomplished. However, when the RIR flip-flop 74 is not set, thereby indicating that no relative addressing is to take place, an active signal will be provided on line 80 indicating that RIR is inactive and will cause Index Adder A2 to add 0 to the output from Index Adder A1 and to pass the value stored in the W2-Register onto cable 92 into the R0-Register 84.

Programs are normally written with reference to address zero. With the use of RIR, the program can be operated in the upper part of the Memory Section 14 and for all purposes appear to be operating at address zero. The contents of RIR acts as a bias to all memory references by a worker program following activation of the RIR flip-flop 74. When a worker program is being executed, all memory references are relative to (RIR) between RIR activation and the occurrence of an Interrupt Signal on line 48. The output signals from the Relative Index Selector 70 are directed on cable 86 as one set of input signals to an Index Adder A2, labeled 88. The other set of input signals to Index Adder A2 are from the higher ordered output stages of Index Adder A1 58. These stages are 6 through 16 and are passed on cable 90 as a set of parallel input signals to Index Adder A2. Index Adder A2 is an 11-bit parallel adder similar to that used for Index Adder A1, and is selected from types available in the prior art. It is the function of Index Adder A2 88 to generate a portion of the absolute address Y* when relative addressing is activated. The sum generated by Index Adder A2 is directed on cable 92 to the higher ordered 11 stages of the R0-Register 84. The lower ordered stages of R0 (5–0) are loaded with the lowest ordered 6-bits from the sum generated in Index Adder A1 via cable 94. The total bit configuration of the R0-Register 84 represents the absolute Memory Address, and in the case of base relative addressing either of the single or dual mode, stores Y*.

Figure 5:
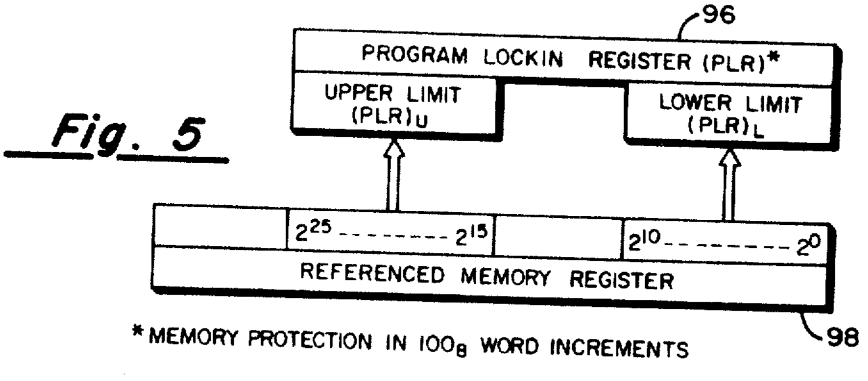
FIGURE 5 illustrates the portion of the referenced memory register which is utilized in establishing the locked in range of addresses for the Program Lock-in Register.

A data processing system which embodies the subject invention includes a memory protection facility wherein upper and lower address limits are established. Any attempted reference to the memory is checked for validity by comparing the memory address to the preestablished limits. In the event the address to be referenced is within the limits, the Memory Access is enabled. In those instances when the address to be referenced is outside the limits, a fault condition exists and the Memory Access is inhibited. The memory protection system is similar to that described in U.S. Patent No. 3,263,218 filed June 22, 1962, and issued on July 26, 1966, assigned to the assignee of this invention. To implement the memory protection, a Program Lock-in Register (PLR) 96 is utilized. It is comprised of a lower limit portion for storing the lowest range of addresses permissible, and an upper limit portion of 11-bits for storing the upper limit of the range of addresses. Referring briefly to FIGURE 5, it can be seen that the Memory Register 98 in the Memory Section 14 which is referenced for loading the Program Lock-in Register 96 is referenced such that bit positions $2^0$ through $2^{10}$ from the referenced Memory Register 98 are directed to $PLR_L$ and that the bit positions $2^{15}$ through $2^{25}$ of the referenced Memory Register are directed to $PLR_U$. Since the lower ordered six bits of each reference address are ignored, it can be seen that the memory protection is directed to increments of $100_8$ words. Of course it can readily be seen that the circuitry could be included for providing memory lock-in down to the individual registers by simply including the full range of addresses in the Program Lock-in Register 96. Returning to a consideration of FIGURE 1, the lower limit of PLR is directed on cable 100 to the Memory Protection Circuitry 102 and the upper limit is directed to the Memory Protection Circuitry on cable 104. The Memory Protection Circuitry can be that of the type described in the above identified U.S. patent. It will be recalled that the R0-Register 84 stores the absolute memory address to be referenced. The higher ordered 11 stages (16 through 6) are passed on cable 106 as the comparison input to the Memory Protection Circuitry 102. Whenever CT 24 determines that the operation is to be a memory accessing one, a signal is passed on control line 108 to enable the address comparison. In those instances when the address to be accessed is within the range of addresses defined by (PLR), the Memory Access Gates 110 are enabled by a signal on control line 112. In those instances when the address is outside of the permitted range, a fault condition is passed on conductor 114 into the Fault Register 116. The Fault Register provides an interrupt signal on conductor 118 to the Fault Priority circuitry 120. Upon the honoring of the addressing fault in the Fault Priority circuitry 120, a disabling signal is passed on conductor 122 to the Memory Access Gates 110, thereby preventing use of contents of the operand stored in the forbidden address of memory. If it is a memory altering instruction and outside the range, the memory register is not altered. Having provided the memory protection feature, the CT provides a control pulse TA to the Memory Access Gates for precisely controlling the timing of the presentation of the address word stored in the R0-Register onto cable 124 where it is directed to the Address Translation and Read/Write Amplifiers in 16. It will be noted of course that the entire contents of the R0-Register 84 is passed on cable 106*a* into the Memory Access Gates 110.

Since only one range of addresses can be protected by the value set in PLR 96, $(PLR)_L$ can be used as one of the base addresses. Accordingly, the value stored in $PLR_L$ is passed on cable 100*a* as a set of 11 parallel input signals to the Relative Index Selector 70. To complete the selection in the dual relative addressing mode, it is necessary to provide an additional control signal. It will be recalled that the RIR flip-flop 74 must be active in order to select base relative addressing. Also it will be recalled that the *f8* designator from IFR determines whether single or dual mode relative addressing is to be utilized. Assuming the instance that dual mode relative addressing is to be used, a control signal selected by the *b*-designator results in the selection between the base address stored in $PLR_L$ and the base address stored in RIR.

Figure 3:
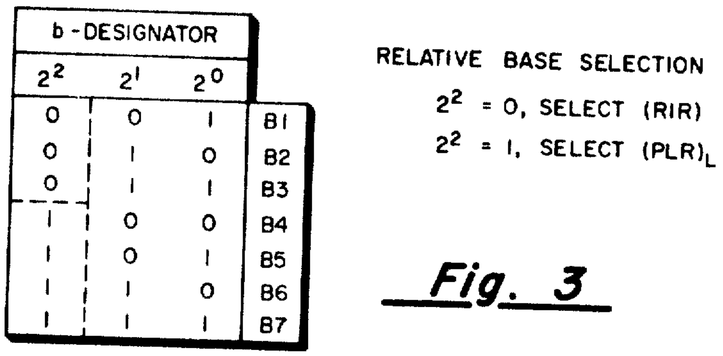
FIGURE 3 is a table which illustrates the *b*-designator signal configurations for selecting between the two available base address constants.

Referring briefly to FIGURE 3, it will be described for this embodiment just how the *b*-designator control signals are utilized. FIGURE 3 illustrates the binary designation of the *b*-designator for B-Registers 1 through 7. In the column $2^2$ it can be seen that the value 0 occurs for B-Registers B1, B2, and B3, and that a value of 1 exists for B-Registers B4, B5, B6 and B7. By definition, for the bank of B-Register selected, a value of 0 in bit position $2^2$ of the *b*-designator will result in a selection of (RIR) as the base address to be added to $y+(B_b)$, and that a value of 1 in this bit position will result in the selection of $(PLR)_L$ as the base address. Returning again to FIGURE 1 it can be seen that the $2^2$ bit position of the *b*-designator is directed on line 32*a* as an input to the Relative Index Selector 70. Thus, it is the combination of control signals from the RIR flip-flop, *f8*, and stage $2^2$ of *b*-designator that controls the relative addressing operation.

In order to address the Memory Section, for sequencing instructions, provision is made to utilize a P-Register 126, or Program Address Register. It is the function of the P-Register to store the absolute address in memory of the instruction that is being accessed. The output from the P-Register is directed on cable 128 to the Address Translation and Read/Write Amplifiers 16. Upon the occurrence of the access control pulse TA, the address is presented on cable 124 to the Address Translation and Read/Write Amplifiers 16 for causing the referenced instruction to be directed on cable 20 into the Instruction Register 22. To accommodate sequencing of the instructions, the contents of the P-Register 126 is also directed on cable 128*a* as an input to an Index $P+1$, referred to as 130. The function of the Index Adder $P+1$ is to receive a bit configuration as an input and to increment it by 1 and provide the result on cable 132 as a set of input signals to OR circuit 134. OR circuits 134 direct the output terminals to cable 136 into the W3-Register 138. At such time as the P-Register 126 has completed its Memory Access, the value stored in the W3-Register 138 is directed on cable 140 as an input thereto, thereby providing the address for the next sequential instruction. This sequence continues until such time as the program directs that the sequence be broken. The sequence can be broken for instance, by loading an operand directly from the *y*-designator portion of the Instruction Register 22 onto cable 142. This value is then directed to OR circuits 134, and causes an alternative condition to be presented to the W3-Register 138. A third alternative is to provide the absolute memory address which has been referenced in memory as an input on cable 124*a* to OR circuits 134. More specifically, the following conditions for altering (P) can be utilized:

(1) Jump instruction (a) Direct jump: the contents of R0 (which is an absolute memory address Y*) are sent to W3 and updated to P. The contents of R0 at this time define a location for an instruction.

(b) Indirect jump: the contents of R0 specify an absolute memory address whose contents specify the address to jump to.

(2) Skip instruction

The next sequential update of P is not used and one more sequential update is made. Therefore the next reference is to $P+2$ instead of $P+1$.

This addressing procedure is well known in the prior art and need not be considered in more detail.

When the Memory Section 14 is being accessed for operands, to be distinguished from the reading of instruction words on cable 20, the operands are directed on cable 143 as input signals to the OP Select circuitry 144. The destination of the operand at that time is dependent upon control signals derived from the CT circuitry 24. The greatest majority of the operand transfers will be to the Arithmetic Section 10, and particularly the X-Register 12 via cable 146. This will be accomplished when CT provides a control pulse TX to OP Select 144. The special cases considered, other than the transfer to the X-Register, will be that of loading the Relative Index Register 66 and leading the Program Lock-in Register 96. The loading of the Relative Index Register 66 will first be considered. To accomplish this, CT provides a control pulse TB to OP Select 144. This control pulse causes the operand to be transferred on cable 147 to the W2-Register 62, and thence on cable 64*a* as an input to RIR 66. In order to load the Program Lock-in Register 96, the Function Code Translator and Command Timing Control 24 issues a control pulse TC to OP Select 144, thereby causing the operand presented thereto on cable 143 to be transmitted on cable 148 to the PLR in a manner illustrated in FIGURE 5. Those bit positions not directed to PLR are omitted from the transfer.

Figure 6:
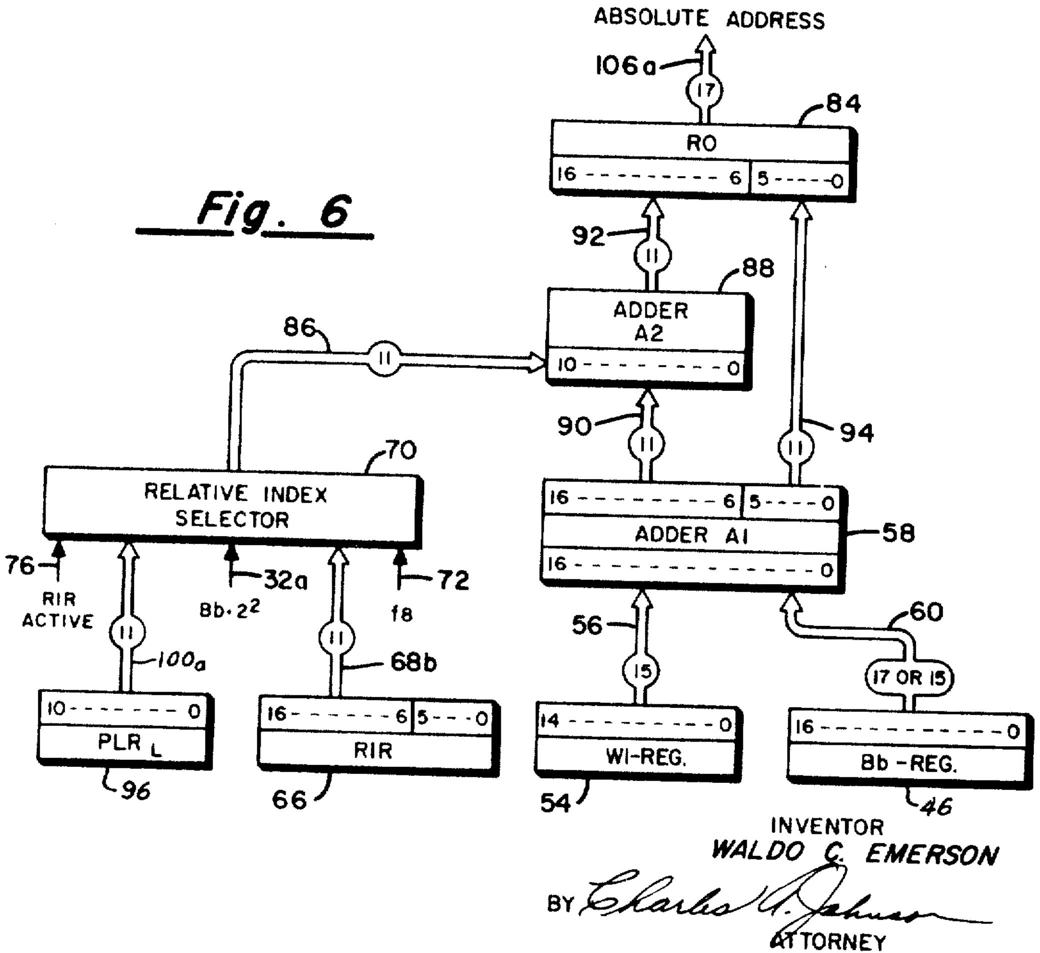
FIGURE 6 is a simplified logic block diagram of a portion of the subject invention.

Having considered the various hardware configurations and considerations with regard to FIGURE 1, that portion of the control section which deals with the determination of an absolute address in the single or dual relative addressing modes is extracted and shown in a logic block diagram in FIGURE 6. Those portions of the hardware which have been previously discussed bear the same reference numeral as utilized in FIGURE 1. For the dual relative addressing mode the *f8* designator in IFR is set and provides a control signal on control line 72 to the Relative Index Selector 70. The RIR flip-flop has been set to the active state and is providing a control pulse on line 76. The status of the B-Register stage $2^2$ determines the selection of the base address between the contents of RIR 66 and $PLR_L$ 96. The programmed relative address is provided as the *y*-designator portion of the instruction and is stored in the W1-Register 54. The selected B-Register $B_b$ 46 is determined by the *b*-designator portion of the instruction, and is directed on lines 60 to Index Adder A1 58. It will be recalled from above that Index Adder A1 forms the sum $y+(B_b)$, and the sum is represented by Y. The higher ordered 11 bits of the operand Y are added to the selected base address bias constant which is provided from the Relative Index Selector 70 on cable 86. The resultant sum formed in Index Adder A2 88 is combined with the lower 6 bits derived from Index Adder A1 and the combination resulting is the absolute memory address Y*. Y* is temporarily stored in the R0-Register 84 for defining the register to be accessed.

OPERATION

Having considered the hardware arrangement of the embodiment of this invention, some illustrative examples and a discussion of the various modes of operation will now be set forth. The invention pertains to a memory addressing system wherein operand addresses, or addresses of the operand address, are expressed in terms of the operands relative position within the program, and can be referred to as a programmed relative address. During execution of a program, a base address constant (bias) is added to the programmed relative address, thereby converting it to its absolute memory address. It will be recalled from above, that the invention provides for the conditions of no relative addressing, or two modes of relative addressing; namely, single and dual. The base address, used in the single mode of relative addressing is taken from the Relative Indexing Register. The two base addresses for the dual mode of relative addressing are taken from RIR and the lower half of the Program Lock-in Register. The relative addressing mode and its activation is under a program control. The single mode of relative addressing is activated by an instruction setting the Internal Function Register, including the *f8* designator, such that the single mode is indicated. For this embodiment this is the selection of a 0 for the *f8* designator. Additionally, it is necessary to execute an instruction to enter the base address constant into RIR. This is a separate instruction having the form and operation indicated below.

ENTER RIR

*f jk*b *y*
77 66b *y*

(a) Instruction Call
(b) Address Modification—$y+(B_b)$
(c) Initiate Memory Section reference
(d) Read operand to OP Select
(e) OP Select Transferred to W2-Register
(f) Bits $2^{16} \ldots 2^{6}$ Transferred from W2-Register to RIR
(g) Set RIR Flip-Flop to Active State.

In order to institute the dual mode of relative addressinf, a different initiation procedure is required. For the dual mode, it is necessary to again load IFR with a set of control bits. To select the dual mode, it is necessary to set the *f8* designator to a 1. Additionally, it is necessary to enter a base address constant in RIR in the manner set forth above. Further, it is necessary to establish a value in PLR such that the lower limit operates as the second base address constant. The bit configuration read from the memory register and entered into the Program Lock-in Register is illustrated in FIGURE 5 and described above. The sequence of operation for loading PLR is as follows.

ENTER PLR

*f jk*b *y*
77 62b *y*

(a) Instruction Call
(b) Address Modification—$y+(B_b)$ (No Relative Indexing in Executive Mode)
(c) Read Operand from Memory Section
(d) Transfer selected bits to PLR
  (1) $2^{10} \ldots 2^{0}$ to $PLR_L$
  (2) $2^{15} \ldots 2^{25}$ to $PLR_U$ Of course, it should be recalled from above that in the setting up of the format of control bits in IFR, it is necessary to establish the bit configuration for use *f6* and *f7* designators for establishing the selection of the set of B-Registers, and to make the selection of whether all B-Registers are to be used are 15-bit capacity, or whether three 15-bit and four 17-bit B-Registers are to be used. It should also be recalled that upon the occurrence of an Interrupt or fault condition that both biasing modes are deactivated.

Figure 2:
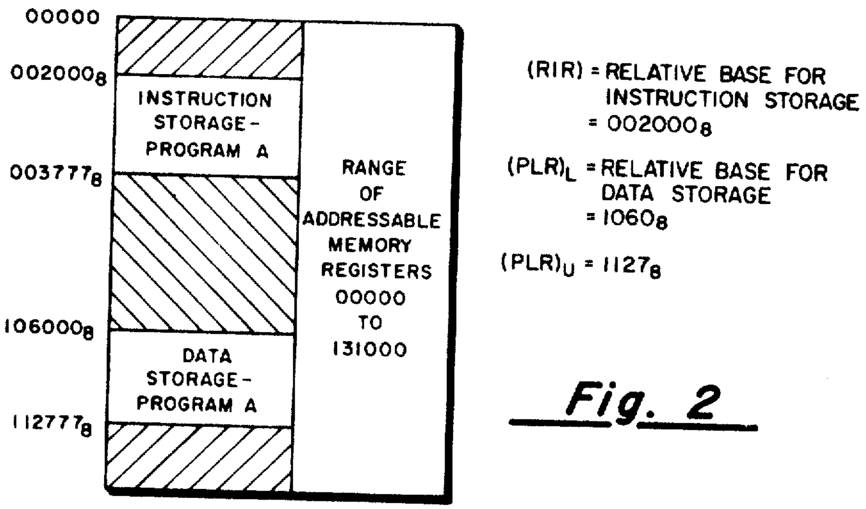
FIGURE 2 illustrates an illustrative arrangement in the memory section wherein instructions are stored in a first memory segments area and data is stored for that program in a removed segment of memory.

For purposes of discussion, and referring to FIGURE 2, it can be assumed that a Worker Program A is to be stored in the sequence of addresses from $002000_8$ through $003777_8$ and that a range of data storage for the Worker Program A is to be established at the addresses in the range of $106000_8$ through $112777_8$. For this example, an ENTER RIR instruction would be executed referring to the address in Memory where the constant $002000_8$ is. This would result in the base address constant being entered in RIR. It will be recalled from above, that for purposes of the base relative addressing operation, only the higher ordered 11-bits of RIR are used; hence, when RIR is selected the value $0020_8$ will be directed to Index Adder A2. For purposes of establishing the second base address constant for use in the dual mode of relative addressing, it is necessary to execute an ENTER PLR instruction. In order to accomplish this, it will be necessary to have stored in the memory section a word that has included therein the upper limit of $1127_8$ in bit positions $2^{25}$ through $2^{15}$, and the lower limit having a value of $1060_8$ stored in bits $2^{10}$ through $2^{0}$. Upon the execution of the ENTER PLR instruction, as described above, these constants will be read from the Memory Section into PLR. For the conditions just set forth, if the *f8* designator in IFR is a 0, only the constant in RIR will be utilized for relative addressing (single mode). If the *f8* designator is 1, the $2^2$ position of the *b*-designator in the instruction word will select between the constant in RIR and the constant in $PLR_L$ to be added to the sum $y+(B_b)$.

Some examples of the B-Register modification and the relative addressing system are felt to be desirable.

When the selection in IFR indicates that 15-bit B-Registers are to be utilized, Index Adder A1 is enabled to the 15-bit mode. It will be noted initially that address 00000 cannot be generated unless $y$ and $(B_b)$ are both 00000. Whenever $y$ and $(B_b)$ are the complements of each other, the sum is $77777_8$. Some other octal examples of the sum $y+(B_b)$ are as follows:

| | | | | | | | |
|---|---|---|---|---|---|---|---|
| y | 12345 | y | 00005 | y | 00001 | y | 77774 |
| (B_b) | 35610 | B_b | 77772 | B_b | 77777 | B_b | 00005 |
| Y | 50155 | | 77777 | | 00001 | | 00002 |

When the B-Register is selected as a 17-bit register, the addition of $y+(B_b)$ is formed by adding a 15-bit *y*-designator portion from the instruction word to a 17-bit number, with the *y*-designator portion positioned to correspond to the lower ordered 15-bits of the 17-bit B-Register. Some octal examples of this addition are set forth as follows:

| | | | | | |
|---|---|---|---|---|---|
| y | 00005 | y | 00001 | y | 77774 |
| (B_b) | 377772 | (B_b) | 377777 | (B_b) | 00005 |
| Y | 377777 | Y | 000001 | Y | 00002 |

The formation of the absolute address Y* by combining either the contents of RIR or the contents of $PLR_L$ with Y is an additive process with no end-around-carry. The lower 6-bits of RIR are always treated as 0, since they are not transmitted into the add operation, the bias is in increments of $64_{10}$ $(100_8)$ words, and the lower 6-bits of $y+(B_b)$ determines the absolute address within the base range. The examples set forth below hold for both RIR and $PLR_L$ selections in forming Y*.

| | | | | |
|---|---|---|---|---|
| (RIR) or $(PRL)_L$ | 0007— | 3777— | 3777— | 2000— |
| $y+(B_b)=Y$ | 300105 | 000077 | 000100 | 3777777 |
| Y* | 301005 | 377777 | 000000 | 1777777 |

Having considered several of the modification examples, the sequence of events for the possible types of memory addressing conditions will be set forth below. The following is the sequence in generating the absolute address Y* when no relative addressing is to be performed.

Figure 7:
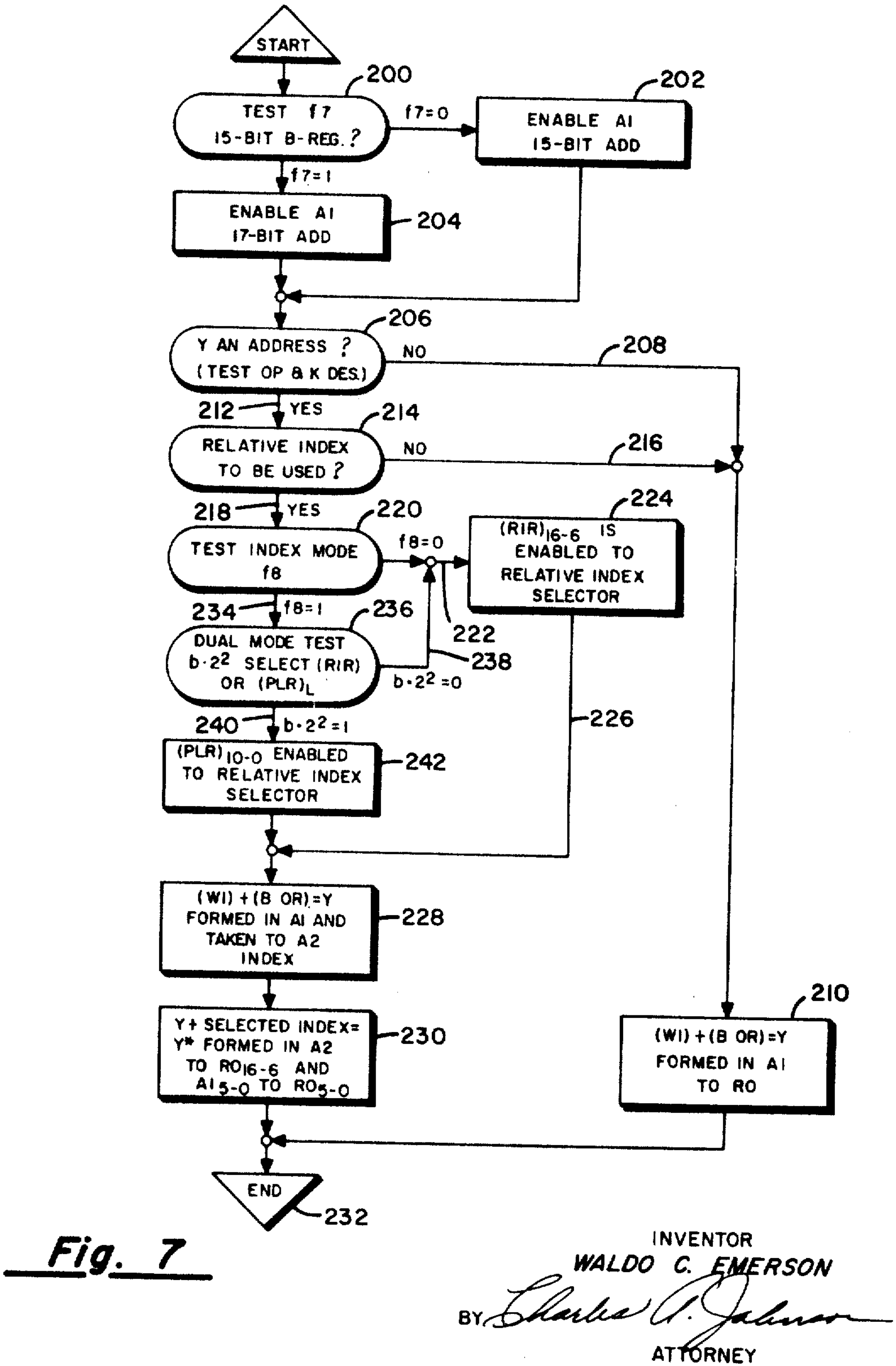
FIGURE 7 is a process flow chart which defines the various steps and decisions made in the relative addressing system of this invention.

NO RELATIVE INDEX SEQUENCE (a) (W1) and ($B_b$) to Al; sum=Y
(b) and 0 to A2
(c) (A2) to R0
(d) (R0)=Y=Y* to Address Translation The sequence of events executed when the single mode of relative indexing is selected by setting $f8$=O is as follows:

SINGLE MODE RELATIVE INDEX SEQUENCE ($IFR$) $2^{27}=0$ (a) (W1) and ($B_b$) to A1; sum=Y
(b) $(A1)_{16-6}$ and (RIR) to A2
(c) (A2) to $R0_{16-6}$ and $(A1)_{5-0}$ to R0
(d) (RO)=Y* to Address Translation Finally, the two possible situations for the dual mode of relative addressing is set forth below. The first condition is that $f8$ be equal to 1. The condition of stage $2^2$ of the $b$-designator then controls the selection between RIR and $RLP_L$, with the sequence of events being shown for the two alternatives as follows:

DUAL MODE RELATIVE ADDRESS SEQUENCE ($IFR$) $2^{27}=1$ (I) Condition $b \cdot 2^2=\mathbf{0}$ (Select RIR)
(a) (W1) and ($B_b$) to A1; sum=$y$
(b) $(A1)_{16-6}$ and (RIR) to A2
(c) (A2) to $R0_{16-6}$ and $(A1)_{5-0}$ to R0
(d) (R0)=Y* to Address Translation (II) Condition $b \cdot 2^2=1$ (Select $PLR_L$)
(a) (W1) and ($B_b$) to A1; sum=Y
(b) $(A1)_{16-6}$ and $(PLR)_L$ to A2
(c) (A2) to $R0_{16-6}$ and $(A1)_{5-0}$ to R0
(d) (R0)=Y* to Address Translation FIGURE 7 is a logical flow diagram of the decision paths and logical operations that are performed in the momory reference sequence. Each of the operations have been described in forms of the hardware utilized and the operations performed above, and this consideration is merely to illustrate a sequence of flow of events with all of the possibilities for memory addresses illustrated in one diagram. At the start of the operation, it is necessary to test the $f7$ designator of IFR to determine whether or not all of the B-Registers in the selected set are to be of a capacity of 15-bits. This decision is indicated by element 200. When $f7$ is equal to 0, Index Adder A1 is enabled to a 15-bit add condition as indicated by block 202. In the event that $f7$ is equal to 1, Index Adder A1 is enabled to a 17-bit add, as indicated by block 204. Having made this determination, it is necessary to test the operation code and the $k$-designator portions of the instruction in the instruction translator to determine whether $y$ is an address, or whether it is itself an operand. This decision is indicated by decision element 206. If the NO path is taken, as indicated by line 208, the formation of the sum $(W1)+(B\ OR)$ is taken to the R0-Register, as indicated by block 210. In the event that $y$ is an address, the YES path 212 is taken, and it is then necessary to determine whether or not relative addressing is to be used. This is accomplished by testing the setting of the RIR flip-flop, and the decision is indicated by decision element 214. If the RIR flip-flop is not set (inactive), it indicates that no relative indexing is to be utilized, for instance in the executive mode following an interrupt, and the NO path 216 is taken, thereby causing the value Y to be transferred to R0. If the RIR flip-flop is set, the YES path 218 is taken, and the form of the relative indexing that is to be selected is tested. This is accomplished by testing the $f8$ designator in IFR, as indicated by decision element 220. If $f8$ equals 0, the single mode of addressing is selected and path 222 is taken, whereby (RIR) 16–6 is enabled through the Relative Index Selector, as indicated by block 224. Having made the selection of (RIR), path 226 indicates that the operation proceeds to the formation of the sum $(W1)+(B\ OR)$ is formed in Index Adder A1, as indicated by block 228. The value Y plus the selected index, in this case (RIR), is directed to Index Adder A2, with the resultant bit configuration being the absolute memory address Y*. This operation is indicated in block 230. For the single addressing mode, the operation is thereby completed and the programmed instruction can continue following the End condition 232. Returning to the testing of the $f8$ designator, if it is found that $f8$ equals 1, path 234 is taken, and the $b$-designator is tested to determine which of two base addresses is to be selected for the determination of the absolute address Y*. This decision is indicated by decision element 236. If the $2^2$ digit of the $b$-designator is equal 0, path 238 results in the selection of RIR as the source of the base address and the operation proceeds as described for the single mode of relative addressing. In the event that the $2^2$ digit of the $b$-designator is equal to 1, path 240 is taken for selecting PLR as the soure of the base address constant. This is indicated by block 242. Having made the selection of the base address to be utilized, the operation continues through blocks 228 and 230 as previously described using the base address $(PLR)_L$ in place of (RIR) as previously described.

Having described the operation of the preferred embodiment of this invention and having fully set forth the advantages thereof, what is intended to be protected by Letters Patent is set forth in the appended claims.

What is claimed is:

1. In a data processing system, having an addressable memory, memory accessing circuitry comprising: receiving means for receiving a programmed relative address for at least in part defining a memory register to be accessed during an instruction execution sequence; control means for providing control signals for selecting a predetermined mode of relative addressing for accessing memory; base relative address constant selector means coupled to said control means for selecting one of a plurality of base address constants in response to said control signals during said instruction execution sequence; and address modification means coupled to said receiving means and to said selector means for forming an absolute memory address from said programmed relative address and the selected one of said base address constants.

2. In a data processing system having an addressable memory system with a plurality of addressable storage registers therein for storing data and instruction operands, relative addressing circuitry for accessing the registers of the memory systems comprising: first register means for receiving and at least temporarily storing signals indicative of a programmed relative address to be accessed in memory; a plurality of index registers, any individual one of said index registers capable of being programmably selectable during a memory accessing operation; first adder means coupled to said first register and the programmably selected one of said index registers for forming a first sum at the output terminals thereof, said first sum indicative of the indexed programmed relative address; second and third register means for at least temporarily storing signals indicative of first and second base relative address constants respectively, each of said base relative address constants being indicative of the degree of removal of a range of addressable memory registers from a predetermined reference address in the memory; relative index selector means coupled to said second and third registers for alternatively selecting one of said base relative addresses for address modification in response to a programmed designation; and second adder means coupled to said relative index selector means and at least a selected number of the output terminals of said first adder means for forming an absolute address to be accessed in memory.

3. A data processing system as in claim 2 wherein said relative index selector means includes means for alternativeley receiving first control signals, a first of said first control signals being indicative of a mode of operation wherein relative addressing during a memory access will take place, and a second of said first control signals is indicative of the mode of operation where no relative addressing will take place during a memory access operation.

4. A data processing system as in claim 3 wherein said relative index selector means includes second means for alternatively receiving second control signals, a first of said second control signals being indicative that only a selected one of said second and third register means is active during a relative addressing operation, and a second of said second control signals being indicative that either of said second and third register means can alternatively be utilized during a relative addressing operation for accessing memory.

5. A data processing system as in claim 4 wherein said relative index selector means further includes third receiving means for alternatively receiving third control signals, a first of said third control signals operating to cause said relative index selector means to select said second register means as a source of base relative address during a relative addressing operation, and a second of said third control signal being operative to cause said relative index selector means to select said third register means as a source of a base relative address constant during a relative addressing operation.

6. In a data processing system having an addressable memory system with a plurality of addressable storage registers therein for storing data and instruction operands, and having instruction reading means for procuring instructions in a predetermined sequence, memory accessing circuitry including: an instruction register for receiving instructions, said instruction register having at least a first portion for storing the function code indicative of the instruction operation, a second portion for storing an index register code indicative of a selected index register, and a third portion for storing an address code for use in accessing memory; a plurality of index registers for use at least in part in modifying said address code; index register control means for controlling the operation of said index registers; index register selector means coupled to said plurality of index registers and to said second portion of said instruction register for selecting one of said index registers according to said index register code; first adder means having output terminals, and a plurality of input terminals, said input terminals coupled to said third portion of said instruction register and to said index register selector means, said first adder means for forming a first sum at said output terminals indicative of the indexed value of said address code; first and second register means for at least temporarily storing signals indicative of first and second base relative address constants respectively; first control means for determining when base relative addressing is active for accessing memory; second control means for alternatively selecting between single and dual modes of base relative addressing; relative index selector means having output means and responsively coupled to said first and second control means for selecting between the base relative address constants stored in said first register and in said second register for transmission to said output means; second adder means coupled to said output means and to at least a selected portion of the output terminals of said first adder for forming an absolute address to be accessed in memory.

7. A data processing system as in claim 6 and further including memory area protection means for protecting predetermined ranges of memory registers from alteration, said memory area protection means including third and fourth registers for storing memory range signals indicative respectively of the upper and lower memory area limit addresses; and comparison means coupled to said third and fourth registers for comparing said absolute memory address to said memory range signals, said comparison means including means for providing a first protect signal when said absolute address is within the range of addresses defined by said third and fourth registers and a second protect signal when said absolute address is without said range of addresses.

8. A data processing system as in claim 7, wherein said fourth and second registers are the same.

9. A data processing system as in claim 6 wherein said first control means includes circuit means for providing a first set of control signals, a first of said first set of control signals indicative of a relative addressing mode of operation, and a second of said first set of control signals indicative of a mode of operation where no relative addressing will take place.

10. A data processing system as in claim 9 wherein said second control means includes circuit means for providing a second set of control signals, a first of said second set of control signals indicative that only a selected one of said first and second register means is active during a relative addressing operation, and a second of said second set of control signals indicative that either of said first and second register means alternatively can be utilized during a relative addressing operation.

11. A data processing system as in claim 10 wherein said relative index selector means includes first input means coupled to said first control means for receiving said first set of control signals; second input means coupled to said second control means for receiving said second set of control signals; and third input means for receiving a third set of control signals from said second portion of said instruction register, a first of said third set of control signals, in combination with said first and second sets of control signals for causing said relative index selector means to select said first register means as a source of base relative address constant, and a second of said third set of control signals, in combination with said first and second sets of control signals, for causing said relative index selector means to select said second register means as the source of the base relative address constant for address modification during a relative addressing operation.

12. A data processing system as in claim 6 and further including third control means for alternatively providing a first signal for selecting a first group of said plurality of index registers and a second signal for selecting a second group of said plurality of index registers; said index register control means including circuit means responsively coupled to said third control means for activating said selected first and second group in response to said first or second signal.

13. A data processing system as in claim 12 and further including fourth control means for providing capacity selection control signals for selecting the effective bit-capacity of predetermined ones in the selected group of said plurality of index registers, a first of said capacity selection control signal operative to cause all of said index registers in said selected group to have the same first predetermined bit-capacity, and a second of said capacity selection control signals operative to cause a first number of said selected group to have said first predetermined bit-capacity and a second number of said selected group to have a second predetermined bit-capacity; said index register control means including input circuitry coupled to said fourth control means for receiving said capacity selection control signals for controlling the bit-capacity of the selected ones of said selected group of said plurality of index registers; and said first adder means including input circuitry coupled to said fourth control means for enabling an add capacity of said first predetermined bit-capacity in response to said first capacity selection control signal and an add capacity of said second preletermined bit-capacity in response to said second capacity election control signal.

14. A data processing system as in claim 6 and further ncluding third register means for at least temporarily storng said absolute memory address, said third register neans including at least two groups of input terminals; irst coupling means for coupling a first of said two groups of input terminals to said second adder means for causing said second sum to form a first portion of said absolute memory address; and second coupling means for coupling a second of said two groups of input terminals to a predetermined group of said output terminals of said first adder means for causing a part of said first sum to form a second portion of said absolute memory address.

References Cited

UNITED STATES PATENTS

| | | | |
|---|---|---|---|
| 3,267,433 | 8/1966 | Falkoff | 340—172.5 |
| 3,365,703 | 1/1968 | Ulrich | 340—172.5 |
| 3,389,380 | 6/1968 | Ashbaugh et al. | 340—172.5 |

RAULFE B. ZACHE, Primary Examiner